United States Patent [19]

Nannini

[11] 4,163,607
[45] Aug. 7, 1979

[54] AUXILIARY LENSES UNIT FOR GLASSES
[76] Inventor: Giorgio Nannini, Via Grandi, 153, Modena, Italy
[21] Appl. No.: 786,845
[22] Filed: Apr. 12, 1977
[30] Foreign Application Priority Data Apr. 30, 1976 [IT] Italy .............................. 4800/76[U]
Jul. 23, 1976 [IT] Italy ............................ 28967/76[U]

[51] Int. Cl.² .............................................. G02C 9/04
[52] U.S. Cl. .......................................... 351/47; 2/13; 351/57
[58] Field of Search ..................... 351/47, 48, 57, 58; 2/13

[56] References Cited
U.S. PATENT DOCUMENTS 3,575,497  4/1971  Leblanc ................................. 351/47
3,876,295  4/1975  Loughner ............................. 351/47

Primary Examiner—Paul A. Sacher
Attorney, Agent, or Firm—Browdy and Neimark

[57] ABSTRACT

This invention refers to an auxiliary lenses unit for glasses, for example colored lenses, to superpose on the generally graduated lenses of a normal pair of glasses. Said unit includes a central body on which a pair of auxiliary lenses hang, by means of a suitable bridge member which can rotate in respect of said central body; this central body is provided with two pairs of pincers, to fix the auxiliary lenses unit to the glasses, whose opening is operated by an element which is integral with one of the two extensions forming each pair of pincers and which acts on it in such a way as to cause, by a manual push, the opening of the pincers owing to the elasticity of the material the above-mentioned central body is made of.

9 Claims, 10 Drawing Figures

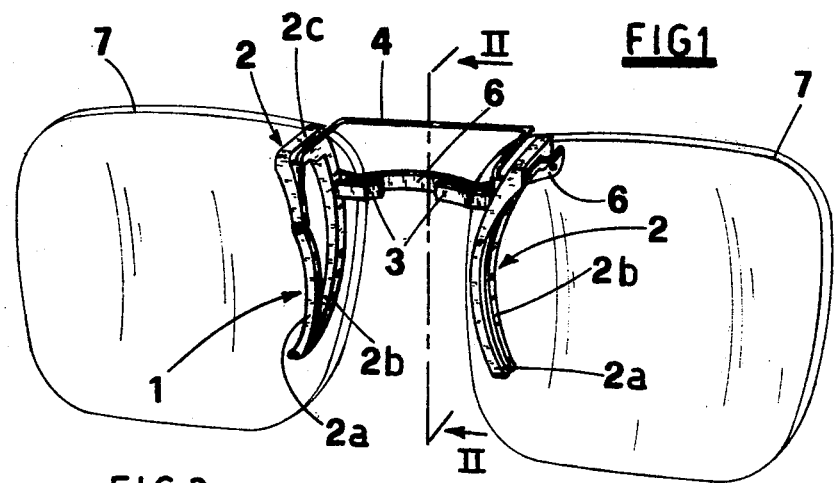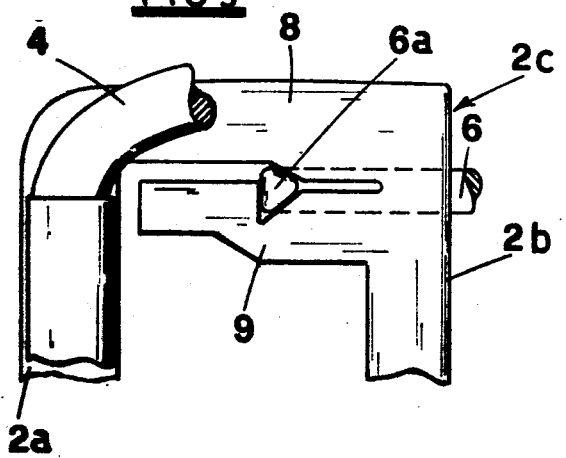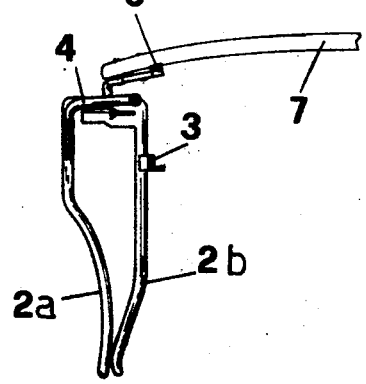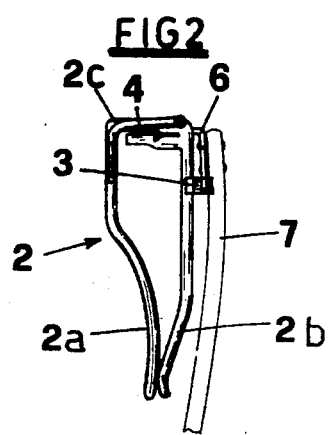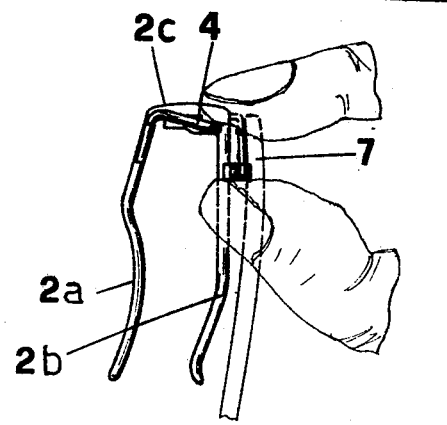

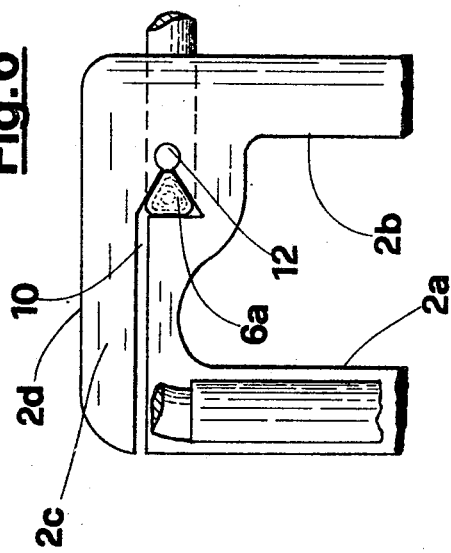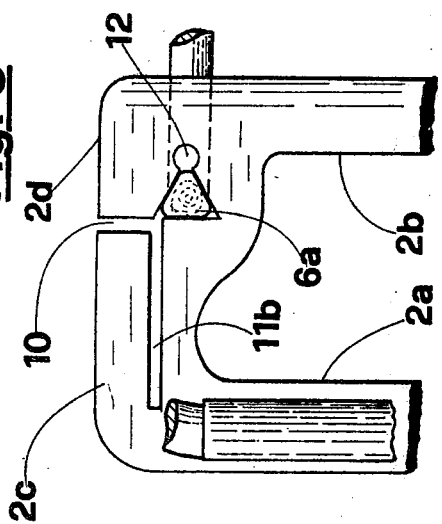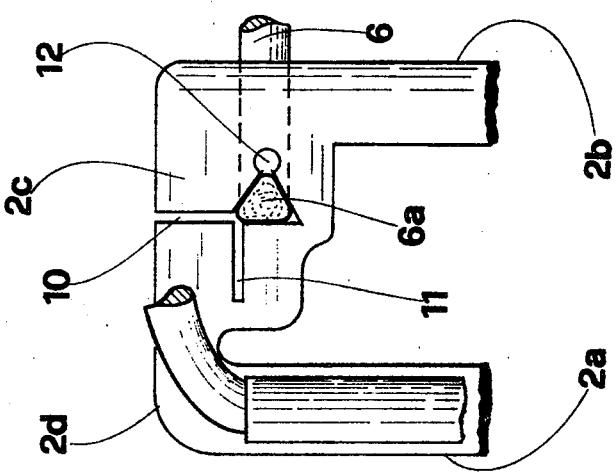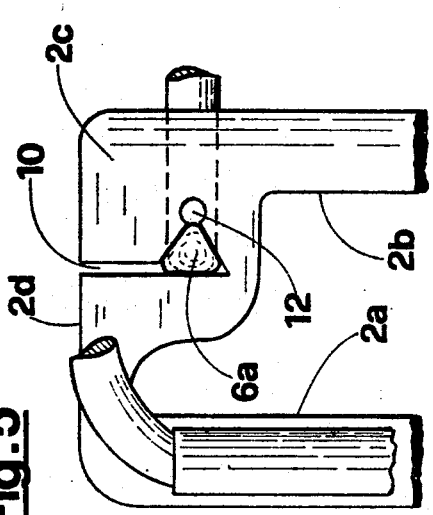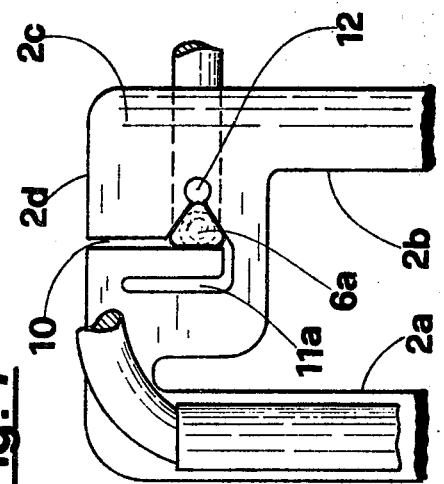

4,163,607

AUXILIARY LENSES UNIT FOR GLASSES

BACKGROUND OF THE INVENTION

This invention relates to an auxiliary lenses unit for glasses.

There are well-known auxiliary lenses units for glasses, for exemple colored lenses, to superpose on the lenses of normal glasses, which essentially include a supporting central body fitted with pincers to join the unit to the glasses and connected with the bridge joining the two auxiliary lenses. There are also well-known auxiliary lenses units whose pincers have a particular structure with elastic springs or the like, so that the only operation by two fingers of one hand may allow the pincers to open in order to connect or disconnect the glasses unit.

But these auxiliary lenses units are rather complex, encumbering, heavy and expensive, because of their structural configuration.

Moreover there are well-known auxiliary lenses units, where the lenses can rotate between a lower end position, where they completely cover the lenses of the glasses, and an upper end position where they keep lifted from the lenses of the glasses and out of the field of view of the bearer's eyes. Yet these auxiliary lenses units exhibit a drawback which causes the wear of the members in reciprocal rotation: after an extended period of use, the auxiliary lenses cannot remain in the upper position steadily, but they tend to fall back to the lower position from gravity.

SUMMARY OF THE INVENTION

An object of this invention is to obviate the above-mentioned troubles by means of a particularly simple, light and low-priced auxiliary lenses unit, which enables a user to open the pincers by using two fingers only.

Another object of this invention is to provide an auxiliary lenses unit in such a way that they can rotate and keep their upper and lower end positions steadily and firmly, and, at the same time, the effect of the pincers gripping the glasses may be effective.

This and other purposes are achieved by the auxiliary lenses unit in question, which includes a supporting central body and a pair of auxiliary lenses linked by a bridge which can rotate and which is supported by the central body; this unit is characterized by the fact that said central body includes two pincers at least, made of elastic material. Each of them is provided with two extensions which extend downwards and almost touch near their lower part. The body also includes an operating element, integral with one of the two extensions for each pincer and fit for giving, through a manual push, a bending moment such as to move the two extensions from each other in each pincer.

Further purposes and features of this invention will be more evident in the following detailed description concerning a type of realization of the lenses unit explained as a pure example and not as a limit in the only drawing where:

FIG. 1 shows a perspective view of the auxiliary lenses unit;

FIG. 2 shows a section in vertical elevation according to the line II—II of FIG. 1;

FIG. 2a shows the same section as in FIG. 2 illustrated in conjunction with two fingers operating the pincers;

FIG. 2b shows the same section as in FIG. 2 where the auxiliary lenses have been rotated in the upper end position;

FIG. 3 shows an enlarged scale detail of FIG. 2 according to a first embodiment

FIGS. 4,5,6,7 and 8 show details of FIG. 3 according to different embodiments.

DETAILED DESCRIPTION OF THE PREFERRED EMBODIMENTS

In the mentioned figures, the symbol (1) is referred to a supporting central body made of elastic material, for example, synthetic resins or metals or other materials.

Body (1) consists essentially of two similar pincers (2) connected to one another by a small crosspiece (3) (in FIG. 1 the small crosspiece (3) has been partially removed to make visible an element lying behind). Each of the pincers (2) includes two thin extensions (2a) and (2b) which extend downwards in the vertical direction and nearly touch near their lower end portions.

These extensions (2a) and (2b) are connected, on their upper portions, by an integral connecting piece (2c).

An operating piece (4), U-bent, has its free ends turned downwards and is steadily connected with the extensions (2a) on their upper portions. This piece (4) extends with its central portions in the intermediate position between the two pincers (2), in the direction of the upper end of extensions (2b).

A metal bridge (6) is connected with two auxiliary lenses (7). This bridge extends its ends upward in the direction of pieces (2c), near which it bends upwardly forming two end pins (6a): Each of the end pins (6a) fits transversely into a piece (2c). This way, the bridge (6) and auxiliary lenses (7) are supported by body (1) and can rotate.

In the first embodiment, illustrated in FIG. 3, piece (2c) is divided into two parts: an upper part (8) linking the upper ends of extensions (2a) and (2b), and a lower part (9) lying behind, next to part (8) which is overhang-connected with the upper end of extension (2b). Between the two surfaces, faced to each other, of the two parts (8) and (9), there is a through hole-shaped seat with triangular, or polygonal, section, which is fit for housing pin (6a) having a triangular section too. A slot or cleft extends, as viewed in FIG. 3, from the seat for one of the pins (6a) between the two parts (8,9). Thus, because the parts (8,9) are integral parts of the elastic body (1), the visible pin (6a) as well as the one associated with the other extension (2b) in its corresponding seat can be rotated and assume a new static position, the rotation being made possible by the elastic nature of the body (1) and the presence of the slot. The slot allows the parts (8,9) to move away from one another as the polygonal or triangularly shaped pin (6a) rotates, the parts (8,9) moving back towards one another because of the elastic nature of the body 1 when the pin (6a) assumes a new static seating position in its seat.

Referring now to FIGS. 4–8, a few other embodiments are shown. In pieces (2c) there is a through seat with polygonal section (in the realizations illustrated in the drawings, the section is triangle-shaped), which is fit for housing pin (6a) having complimentary polygonal (triangular) section. In pieces (2c) there is also a through cleft (10) starting from the seat of pin (6a) and reaching the upper surface (2d) of piece (2c); this surface is overlying and external in respect of extensions (2a) and (2b). The cleft (10) shown in FIGS. 4–8 serves the same function as the slot or cleft mentioned above in connection with FIG. 3.

In the embodiment illustrated in FIG. 4, cleft (10) extends in the vertical direction from the top apex of the triangular seat to the intermediate part of the upper surface (2d). Another through cleft (11) starts from the top apex of the triangular seat and extends horizontally towards the upper end of extension (2a) without reaching it.

In the embodiment shown in FIG. 5, cleft (10) extends in the vertical direction, starting from the top apex of the triangular seat and reaching the intermediate part of the upper surface (2d). Piece (2c), compared with the type illustrated in FIG. 4, is narrower on the side where it is connected with extension (2a), but it broadens again in the zone where the triangular seat is placed and where it is connected with extension (2b).

In the embodiment illustrated in FIG. 6, cleft (10) extends horizontally starting from the top apex of the triangular seat and ending laterally over the point where extension (2a) is connected with piece (2c).

In the embodiment shown in FIG. 7, cleft (10) extends vertically starting from the top apex of the triangular seat and reaching the intermediate part of the upper surface (2d). Another through cleft (11a), L-shaped, starts horizontally for a short stretch from the lower apex of the triangular seat, then goes on vertically towards surface (2d) without reaching it.

In the embodiment shown in FIG. 8, cleft (10) extends in the vertical direction starting from the top apex of the triangular seat and reaching the intermediate part of the upper surface (2d). Another through cleft (11b) starts from the top apex of the triangular seat and extends horizontally in the zone where piece (2c) is connected with extension (2a), without reaching the outside surface.

A circular through hole (12) is placed on the apex of the triangular seat facing extension (2b).

The pincers operation to connect or disconnect the auxiliary lenses on the normal glasses may be carried out by means of two fingers only (as shown in FIG. 2a): by pressing piece (4), a rotating moment on piece (2c) is caused, which makes the two extensions (2a) and (2b) of both pincers (2) move from each other; this way, it is possible to connect or disconnect easily the auxiliary lenses unit on the glasses. When stopping the fingers' action on piece (4), owing to the elasticity of the material pincers (2) are made of, the two extensions (2a) and (2b) come close again (as shown in FIG. 2) so as to clasp and tighten the lenses of the normal glasses (not shown in the figures) on which they are applied. Auxiliary lenses (7) can be rotated in two end positions: a lower position (shown in FIG. 2) where the auxiliary lenses cover the normal lenses, and an upper position (shown in FIG. 2b) where the auxiliary lenses keep lifted horizontally and are out of the bearer's field of view.

When the auxiliary lenses are in the two above-mentioned end positions, the triangular section of pin (6a) fits the section of the triangular seat; but when the auxiliary lenses are rotated between said end positions, pin (6a) pushes with its apexes the sides of the triangular seat making them open slightly and meeting, during this stage, a certain resistance caused by the elasticity of the material piece (2c) is made of. Consequently the elasticity of the material of piece (2c) and the shape of the triangular seats evaporate to make the auxiliary lenses to remain steady in the end positions.

To this purpose, the configuration and the arrangement of piece (2c), of clefts (10) and (11) or (11a), (11b), and of hole (12), are very important. The clefts (11, 11a and 11b) and the hole (12) cooperate with the cleft (10) so as to allow the pin (6a) to be rotated in its seat, to return to its initial shape, and thus hold the pin 6a in its new position.

They achieve in fact the purpose to produce, in piece (2c), some proper less resistant points where the bendings of the material preferentially occur.

Besides, expecially according to the types of realizations illustrated in FIGS. 4–8, they have the purpose to supply a greater resistance to the opening action of the pincers in respect of the closing action: so they produce a force which, after a very short opening stretch, keeps extensions (2a) and (2b) close to each other, with a greater force. In fact a moving effect of extensions (2a) and (2b), after a very short movement thereof, closes clefts (10) and (11) (or (11a), (11b)), that is it makes the faced surfaces of these clefts contact, and consequently causes a greater resistance effect to the opening rotation by the material the pincers are made of.

Besides, the particular configuration and arrangement of cleft (10) is properly designed in such a way that, during the rotating stage of the auxiliary lenses from one end position to the other, the rotation of pin (6a) in the triangular seat causes a force which tends to close pincers (2) more tightly and to fix even more steadily the auxiliary lenses to the normal glasses during this stage.

All that occurs because the rotation of pin (6a) inside the triangular seat tends to open cleft (10) even more and then to rotate extensions (2a) and (2b) in the closing direction. The circular shape of hole (12) has the main purpose to avoid eventual cases of so-called "notching" which would damage the structure.

Obviously this invention, in practice, can have different enbodiments and variants from the above-mentioned ones, particularly it is possible to make several practical changes in it without scope of this invention as below claimed.

I claim:

1. An auxiliary lenses unit for glasses, the unit consisting of a supporting central body and of a pair of auxiliary lenses linked by a bridge which can rotate and which is supported by said central body including two pincers each made at least in part of elastic material, each of said pincers being provided with two extensions (2a) and (2b) that extend downwards and almost touch near their lower portions; an operating member (4) which forms part of said central body integral with one of the two extensions of each of said pincers and fit for supplying, through a manual push, a bending moment such as to move the two extensions of each of said pincers from one another, said bridge having two pins (6a) at its ends which fit in said central body, said pins having a polygonal section and being fitted in corresponding seats in said central body having the same polygonal section.

2. A unit according to claim 1, wherein said piece (4) extends centrally towards the bridge linking the auxiliary lenses while the ends are integral with the upper ends of extensions (2a), as the latter are the most distant from the auxiliary lenses.

3. A unit according to claim 1, wherein said seat with polygonal section is defined between faced surfaces of two horizontal parts (8) and (9) made of elastic material, one of these parts at least being overhung next to the other by said central body.

4. A unit according to claim 1, wherein each of two elastic connecting pieces (2c) of the central body which connect extensions (2a) and (2b) on the upper part, there is a through cleft (10) at least which starts from said seat of polygonal section and reaches the upper surface of respective pieces (2c), this surface overlying and being external with respect to said extensions (2a) and (2b).

5. A unit according to claim 4, wherein said cleft (10) starts from an apex of the polygonal seat and extends in the vertical direction reaching the intermediate part of said upper surface, and including another through cleft (11) starting from an apex of the polygonal seat and extending horizontally towards the upper end of at least one of said extensions (2a) without reaching it.

6. A unit according to claim 5, wherein said cleft (10) starts from an apex of the polygonal seat and extends in the vertical direction reaching the intermediate part of said upper surface, a piece (2c) narrowing in the zone where it is connected with extension (2a).

7. A unit according to claim 5, wherein said cleft (10) starts from an apex of the polygonal seat and extends horizontally ending laterally over the point where an extension is connected with at least one of said pieces (2c).

8. A unit according to claim 5, wherein said cleft (10) starts from an apex of the polygonal seat and extends in the vertical direction reaching then the intermediate part of said upper surface; and including another cleft (11a), L-shaped, which starts, horizontally for a short distance, from the polygonal seat and goes on vertically towards said upper surface without reaching it.

9. A unit according to claim 5, wherein said cleft (10) starts from a top apex of the polygonal seat and extends vertically reaching the intermediate part of said upper surface; another through cleft (11b) starts horizontally from an apex of the polygonal seat and extends horizontally in the zone where at least one of said pieces (2c) is connected with an extension, without reaching said upper surface.

* * * * *